Oct. 13, 1931.   A. C. FISCHER ET AL   1,827,193
CUTTING EQUIPMENT FOR PLASTIC SHEET MATERIAL
Filed Oct. 16, 1926   3 Sheets-Sheet 1
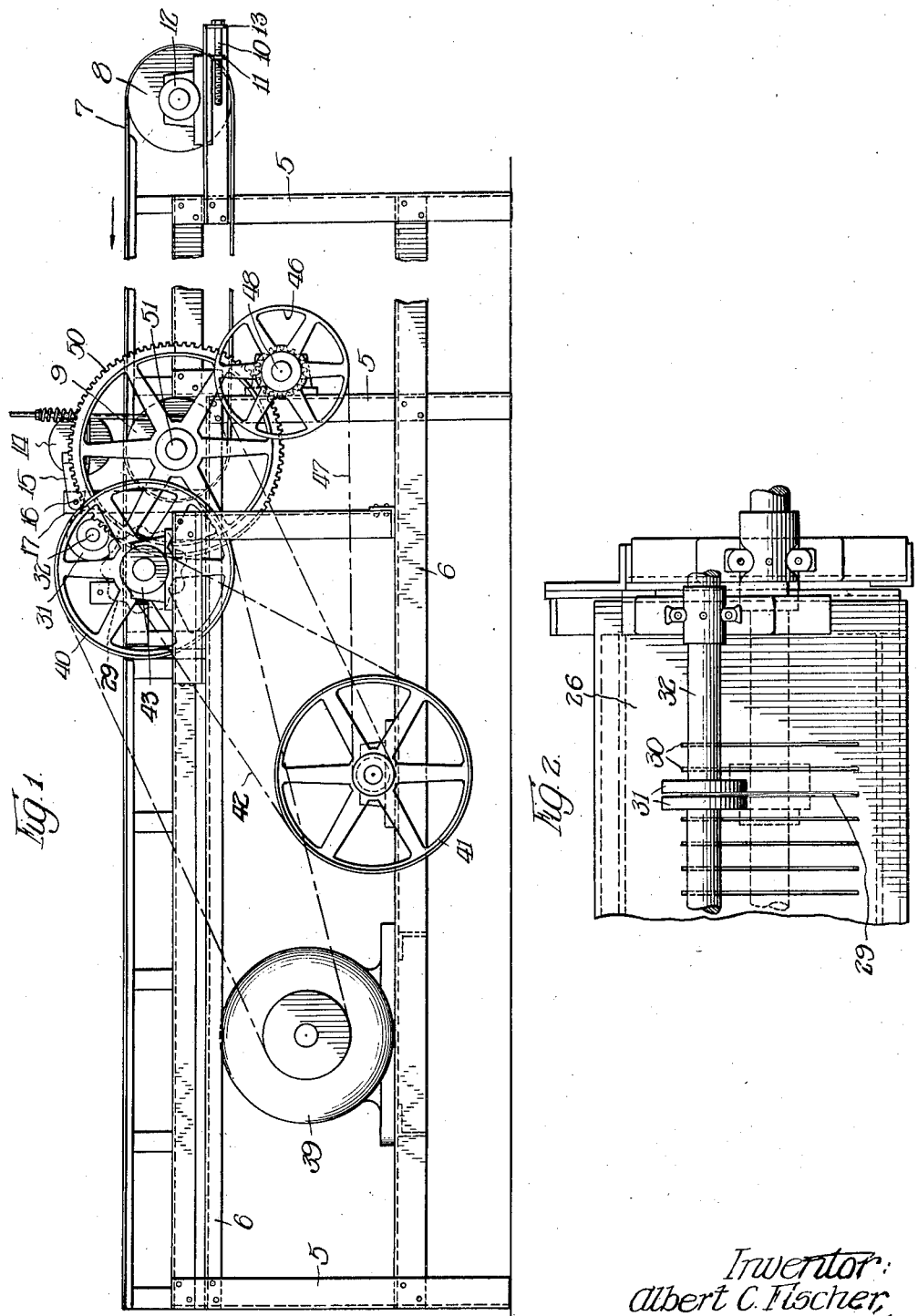
Inventor:
Albert C. Fischer,
Burns A. Stewart,
Henry W. Herbst, Inventors:
Albert C. Fischer,
Burns A. Stewart,
Henry W. Herbst, Oct. 13, 1931.   A. C. FISCHER ET AL   1,827,193
CUTTING EQUIPMENT FOR PLASTIC SHEET MATERIAL
Filed Oct. 16, 1926    3 Sheets-Sheet 3

Inventors:
Albert C. Fischer,
Burns A. Stewart,
Henry W. Herbst,

Patented Oct. 13, 1931

1,827,193

UNITED STATES PATENT OFFICE

ALBERT C. FISCHER, BURNS A STEWART, AND HENRY W. HERBST, OF CHICAGO, ILLINOIS, ASSIGNORS, BY MESNE ASSIGNMENTS, TO THE PHILIP CAREY MANUFACTURING COMPANY, A CORPORATION OF OHIO

CUTTING EQUIPMENT FOR PLASTIC SHEET MATERIAL

Application filed October 16, 1926. Serial No. 142,028.

Our invention relates in general to sheet cutting equipment and has particular reference to cutting plastic sheet material into strips, as for example, the manufacture of preformed expansion joint material.

In manufacturing expansion joint material, at least that kind made from a composition of bituminous material having fibre incorporated therein, the material after being mixed into a homogeneous mass, and while still warm, is usually transferred to a sheet forming apparatus and rolled into sheets of the desired thickness, the thickness of the sheet varying according to the dimension of the expansion joint ultimately produced.

After the sheets go thru the sheet forming apparatus they usually travel on a belt or table and are finally cut into strips of the desired length and width. This cutting operation according to our invention can be carried out as a continuous step in the sheet forming operation. In other words, the strips may be cut by our apparatus immediately, so to speak, after the material has been formed into a sheet. This is more or less an advantage since the cutting apparatus has an opportunity to perform while the material is warm and more or less soft compared to its condition after it has cooled off. We do not mean by this that it is necessary to operate our cutting apparatus at this stage of the operation, as we have provided for conditions which will enable the apparatus to be used at any time after the material has been formed into sheets. For instance, instead of installing the apparatus in combination with the sheet forming apparatus it may just as well be set up in any convenient location apart therefrom and used for cutting the sheets into strips at any time after this material has been formed into sheets. At this stage, however, the material, of course, will be cold and harder to cut, but we have modified the apparatus for this particular purpose.

In the accompanying drawings Figure 1 is a view in side elevation of the cutting apparatus.

Figure 2 is a top plan view of a portion of the apparatus showing the knife arrangement.

Figure 3:
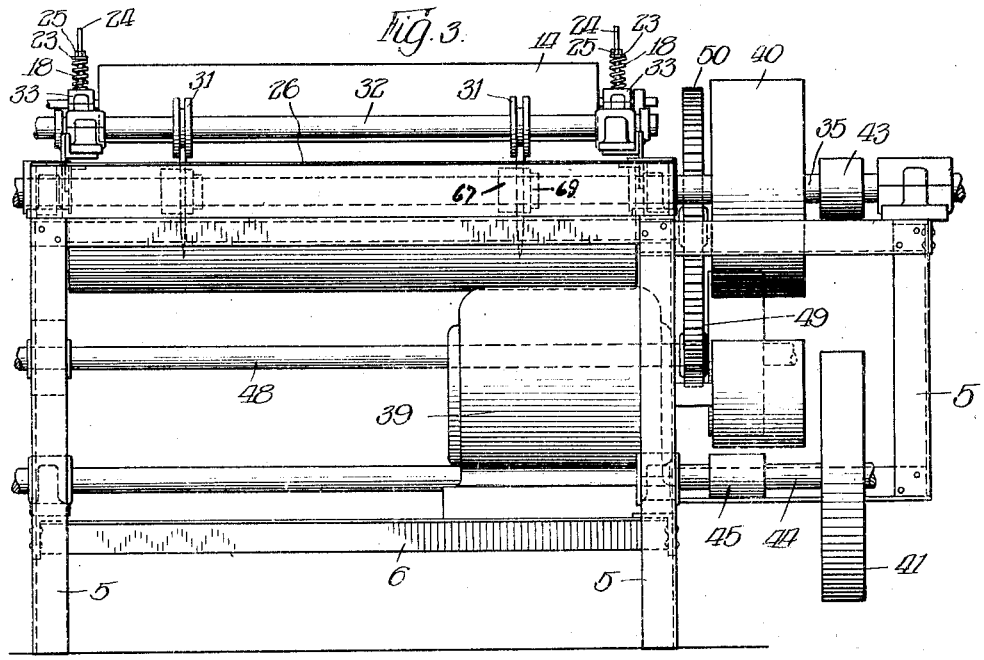
Figure 3 is an end elevation of the apparatus.

Referring now to the drawing in detail, and particularly with reference to the form of apparatus shown in Figures 1 to 4 inclusive, —5— represents the upright members and the supporting legs of the table, which supports the operating mechanism of the apparatus, the supports being reinforced by a sufficient number of horizontal members 6 so as to make up the proper kind of support for the parts of the apparatus, so that the same may be mounted in operating relation to one another in a suitable and practical manner. The supporting structure briefly referred to as members 5 and 6 may be produced from angle irons or any other structures suitable for the purpose, as is customary in manufacturing equipment of this kind.

In reducing the apparatus to practise the sheet to be cut into strips will be laid on the top of the endless belt —7— and fed into the apparatus in the direction of the arrow shown in Figure 1. The belt travels around an idler drum or roller —8— and around the driven roller —9—. The diameter of the rollers —8— and —9— are substantially the same and they are mounted with their axes of rotation in the same horizontal plane so that the belt —7— is maintained level. A suitable belt tightening device, shown as at —10—, may be used for taking up any slack in the belt by moving the idler roller —8— away from the roller —9—, and this tightening device so far as the illustration is concerned comprises a bolt which is threaded in a shoulder —11— which forms a part of the mounting —12— of the roller —8—, so that by turning up on the bolt the mounting —12— for the roller will be pulled toward the anchored end —13— of the bolt.

When the material is laid upon the belt —7— and the apparatus is in operation the material will be carried toward the knives (to be hereinafter more particularly referred to) but it will not reach the knives until it has passed under a smoothing roller —14—, the same being supported between two arms —15—, which in turn are pivoted as at —16— to a pair of uprights —17—.

Figure 4:
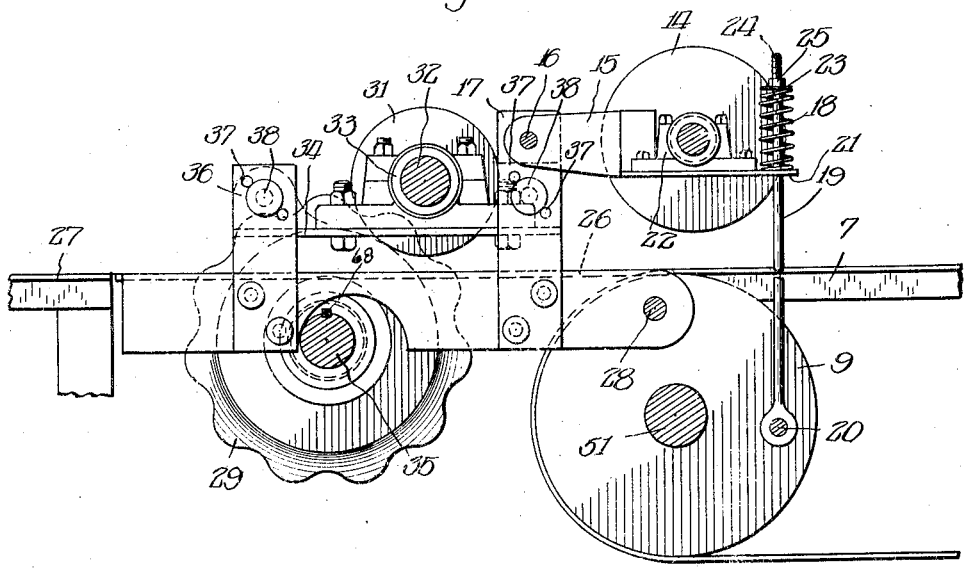
Figure 4 is a detailed view in side elevation of the knife arrangement.

For a better description of this smoothing roller, reference is made to Figure 4, in which the parts are shown enlarged.

The roller —14— is simply an idler, that is to say, it is not driven by any parts of the mechanism and only rotates under the friction of the material passing between it and the belt —7—. The purpose of this roller is to act as a so-called hold-down for the material, so that when it comes in contact with the knife it will not buckle.

The spring influenced roller 14 is to hold the material against the belt so that it will be fed on the cutting table and not retarded by the resistance developed by the cutting knives. In other words, the knives as they are cutting thru the material will have a tendency to retard the feed of the material, and unless means are provided, such as the roller 14, for holding the material against the belt the material would simply slip on the belt and the feed would be interrupted. The roller 14 would also keep the material from buckling up, which it would likely do in the absence of the roller, due to the resistance made with the knives. The tension for the roller —14— is developed by a pair of springs —18—, which are mounted to their respective rods —19—, which in turn are anchored as at —20— to some convenient part of the supporting structure of the apparatus. The rods pass thru openings in extension —21— from the bearing mountings —22— of the roller. The springs —18— are seated between the extension —21— and washers —23— at the top of the rods. The ends of the rods are threaded as at —24—, so that nuts —25— may be used as means for adjusting the tension of the springs —18—, the nuts in this respect contacting with the washers —23— on top of the springs.

In practice it would be desirable to adjust the roller —14— so that its spaced relation with respect to the belt —7— is about the same as the thickness of the material to be cut, and in this way as the material is fed into the apparatus the roller —14— will bear down on the same under the influence of the springs —18—. Caution should be taken, however, so as not to develop too much resistance at this point since the cutting resistance must be taken into account, and if the resistance of the roller —14— is too severe it would retard the movement of the material thru the apparatus, in fact in cutting relatively hard or rigid material the roller —14— may be dispensed with altogether, since there is hardly any likelihood of this kind of material buckling up, particularly when the knife guides (to be further referred to) act in substantially the same capacity as the roller —14—. The relative position of the roller —14— in both Figures 1 and 4 show the same in an inactive position.

The position of the roller, as explained, may be adjusted by turning up on the nut —25— and the rod —19— and when relatively hard or rigid material is to be cut and the roller is not required the nut may simply be run up on the rod and the loosened tension of the spring —18— will enable the roller to move up, with the result that it does not contact with the material at all.

The material after leaving the belt —7—, and without interruption to this movement, passes upon a table —26—, which bridges the space between the belt —7— and the receiving table —27—. This table —26— is movable, so to speak, in that it forms a flat top for a structure which is hinged as at —28—. The opposite end of the table or structure is not connected to the receiving table —27—, so that it may be swung upward on the pivots —28— and out of cooperative relationship with the knives —29—. The table top —26— is made with a multiplicity of spaced parallel slots —30—, each of which is of a dimension to receive the knife, such as —29—, so that while the axis of the knives are in a plane below that of the table their cutting edges project above the table so as to operate on the material in passing over the material. For each knife will be provided guide rollers —31—, the same being mounted with freedom of rotation by means of a shaft —32— which is journalled in the bearings —33—, the bearings in this respect being mounted on cross bars —34— forming a part of the supporting structure for the table —26—.

The guide rollers are made with a circumferential slot to receive the knives, and their structure also provides a scraping device for the knives, which is an advantage since the material to be cut is of a more or less adhesive consistency. The guide rollers also serve to hold the material down and against the knives, due to the fact that the material must pass under the guide rollers in the cutting operation.

The knives are mounted on a common shaft —35—, and the arrangement shown works out to a decided advantage since the knives may be longitudinally adjusted on the shaft, and arranged in most any adjusted spaced relation to one another, so that the width of the strips to be cut may be predetermined. In other words, if a 4 inch strip is to be cut from the sheet the knives will be spaced 4 inches apart and the slots —30— in the table top —26— are numerous enough to permit this adjustment of the knives, in fact it would even be possible to cut an inch strip. To do so the slots —30— would be 1 inch apart and one knife would be adjusted to fit one slot and another knife adjusted to fit an adjacent slot. It is of course understood that the guide rollers —31— are likewise adjusted to register with the knives, and for this reason they are likewise slidably mounted on the shaft —32—. The knives may be advantageously secured by some such means, as collar 67, which is keyed to shaft 35 by a pin 68 and clamped thereon by a nut 69.

The spaced relation between the rollers —31— and the surface of the table top —26— may be adjusted by elevating or lowering the rollers. This is of course necessary in order that sheets of different thicknesses may be cut. To make this adjustment the supporting structure for the rollers —31—, which includes the shaft —32—, and the bearings —33—, as well as the supports —34—, may be adjusted with respect to the uprights —36—, one of which being the member —17— to which the arm —15— of the roller —14— is pivoted. To make this adjustment a plurality of openings —37— are provided in the uprights —36— and a suspending device —38— on the support —34— is so constructed that it may selectively engage any one of the openings —37—, for instance, a lower opening or a higher opening. As shown in Figure 4 intermediate openings —37— are engaged thereby. To elevate the rollers —31— and accommodate a greater thickness of material the next higher one of the openings —37— would be engaged, or to compensate for a lesser thickness of the material one of the lower openings would be engaged. To change the spaced relation of the knives —29— on the shaft —35— the entire top table —26—, together with its supporting structure, could be swung up about the pivot —28—, leaving unobstructed access to the knives. They may then be adjusted longitudinally on the shaft —35— without difficulty; and longitudinal adjustment of the rollers —31— may be accomplished without swinging the table up from its normal active position. The knives and the endless belt —7— are the only parts of the apparatus to which a drive is imparted, that is to say, a power drive. To accomplish this drive an electrical motor —39— is supported on the horizontal members of the supporting structure for the apparatus, and a belt or other suitable driving means connects the motor with a relatively large driven pulley or the like —40—, which is co-axially mounted on the shaft —35— for the knives, and which in turn, aside from rotating the knives, also imparts a drive to a similar pulley or the like —41—, thru means of a belt, chain or the like —42—, which is driven from the relatively small pulley —43—. The pulley —41— is mounted on the shaft —44—, and this shaft is equipped with a relatively small driving pulley —45—, which drives the pulley —46— by a crossed belt or the like —47—. Mounted on the shaft —48— of the pulley —46— is a tooth-pinion —49—, which meshes with a relatively large gear wheel —50— and drives the same. This relatively large gear wheel —50— is co-axially mounted on the shaft —51— of the driving drum —9— of the belt —7—.

From the above it can be seen that the electric motor drives the knives, and the power is then imparted to the belt —7— thru the medium of the connected driven and driving pulleys —41—, —46— and the gears —49— and —50—, the last mentioned gear being co-axially mounted with the drum —9— on the shaft —51—.

Figure 5:
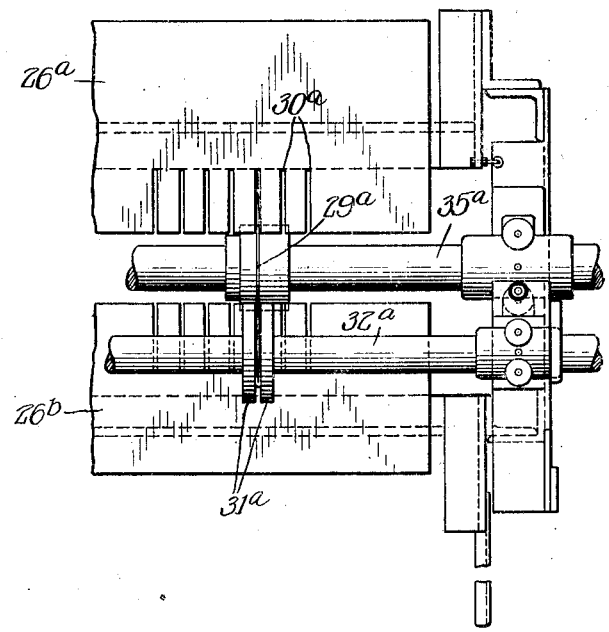
Figure 5 is a detailed view in plan of a modified form of the knife arrangement.
Figure 6:
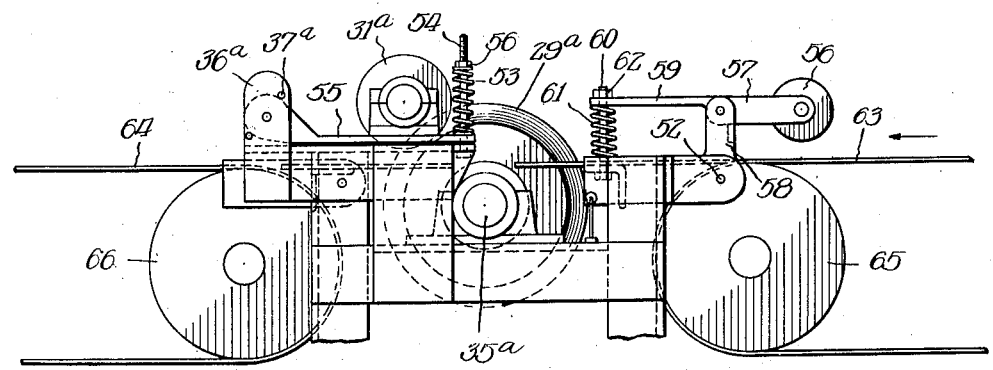
Figure 6 is a detailed view in side elevation of the knife arrangement shown in Figure 5.

Referring to Figures 5 and 6 which show a slightly modified form of the apparatus the table top —26— is shown as being made in two separate parts —26ª— and —26ᵇ—, each part being suitably pivoted for instance as at —52—, so that they may be swung up about these pivots to enable access to be had to the knives —29ª—. These knives like the knives —31— are slidably mounted on a shaft —35ª— and the guide rollers —31ª— for the knives are likewise slidably mounted on a shaft —32ª—. The slots for the knives in this form of the apparatus are shown as at —30ª— and the same commence at the inner edge of the table top —26ª—, so that the slot in one section of the table top cooperates with the slot in the opposite section of the table top to receive a knife. The adjustment for the guide rollers —31ª— is somewhat different than in the first described form of the apparatus, in that while openings —37ª— are provided in an upright —36ª— for raising and lowering the rollers are further provided with a spring tension device comprising springs —53— which are mounted on rods —54—. One end of the spring presses the horizontal part —55— on the mountings for the rollers —31ª— and each opposite end spring —53— comprises an adjacent locking device, comprising the nut —56—. The same principle being involved here as with respect to the spring tension device for the roller —14—.

To control the material as it is fed into the apparatus, that is to say, when it is warm and more or less plastic, an introductory roller —56— is supported by the arm —57—. This arm is fulcrumed to the post —58— and extension —59— and the same engages a short rod —60—. The rod —60— is equipped with a spring tension device —61— with a nut —62— for adjusting the tension of the spring.

In this form instead of using one belt a pair of belts are used, both of which are suitably driven in any desired manner, the belts being shown as at —63— and —64—, with rollers —65— and —66— used for driving the same. The shaft —35ª— for the knives is driven in the same manner as is described with reference to the other figures.

It is to be noted that in the forms shown in Figures 5 and 6 the guide rollers for the knives —29ª— are in back of the knives, whereas in the other form of the apparatus the guide rollers for the knives are in front. For the most part the form shown in Figures 5 and 6 is for cutting strips from sheets that are warm, consequently the same precautions against buckling need not be accounted for, particularly when the roller —56— may be relied on for this purpose.

While the rollers —31— and —31ª— have been generally referred to as guides for the knives, an equally important function which they perform is bearing down on the material astride the cut made by the knives so as to insure smooth cut edges. Then again they act as scrapers for the knives which helps to keep them clean.

The high speed of the knives cutting into the plastic material keeps the knives so hot that the material is melted to such a consistency that it will not adhere to the knives to such an extent that it will clog them.

We claim:

1. In an apparatus for cutting strips from sheets, a rotary shaft, a plurality of knives adjustably mounted on said shaft to slide longitudinally therealong into spaced relation to determine the width of the strip to be cut but to be rotated therewith in all positions of adjustment, and means comprising a slotted member through which said knives project for maintaining the knives in spaced relation.

2. In an apparatus of the class described, a plurality of rotatable knives, a rotating shaft on which said knives are mounted in spaced relation, said knives being slidable longitudinally on the shaft for changing their spaced relation to determine the width of the cut made thereby, a table, below which said rotating shaft is mounted, having slots thru which the knives project, guides for said knives mounted above said table, and means for elevating and lowering the guides with respect to the table, said guide being mounted in adjustably spaced relation to register the same with the changeable position of the knives.

3. In a cutting apparatus of the class described, a table upon which the material to be cut is fed, a belt for feeding the material upon said table, means for holding the material on the belt under tension, said table having a plurality of parallel slots therein, knives projecting through said slots, knife guides mounted above the table and registering with the knives, and means for elevating or lowering the guides with respect to the table for accommodating materials of various thicknesses.

4. In a cutting apparatus of the class described, a table upon which the material to be cut is fed, a belt for feeding the material upon said table, means for holding the material on the belt under tension, said table having a plurality of slots therein, rotary knives projecting thru said slots, and means mounted above the table adapted to hold the material to be cut flat upon the table and co-operate with the knives to cut the material into strips.

5. In a cutting apparatus of the class described, a table upon which the material to be cut is fed, a belt for feeding the material upon said table, means for holding the material on the belt under tension, said table having a plurality of slots therein, rotary knives projecting thru said slots, and means mounted above the table adapted to hold the material to be cut flat upon the table and co-operate with the knives to cut the material into strips, said means being adjustable with respect to the table to accommodate the apparatus to materials of different thicknesses.

6. In a cutting apparatus of the class described, a table upon which the material to be cut is fed, a belt for feeding the material upon said table, means for holding the material on the belt under tension, rotary knives mounted below the table but projecting above the same to intercept the material and cut it into strips, and means mounted in co-operative relationship with the knives for straddling the cuts made by the same and holding the material upon the table.

7. In a cutting apparatus of the class described, a table upon which the material to be cut is fed, rotary knives mounted below the table but projecting above the same to intercept the material and cut it into strips, and means mounted in co-operative relationship with the knives for straddling the cuts made by the same and holding the material upon the table, said means comprising rollers mounted with freedom of rotation, and grooves in said rollers in which the knives rotate.

8. In a cutting apparatus of the class described, a cutting table upon which the material to be cut is fed, rotary knives mounted in spaced relation for cutting the material into strips as it is fed across the table, and means for holding the material upon the table surface during the cutting operation, comprising grooved rollers mounted with freedom of rotation and in spaced relation to the table to accommodate the thickness of the material, the grooves in said rollers being in alignment with the knives and straddling the cuts in the material made by the knives.

9. In a cutting apparatus of the class described, a cutting table upon which the material to be cut is fed, rotary knives mounted in spaced relation for cutting the material into strips as it is fed across the table, means for holding the material upon the table surface during the cutting operation, comprising grooved rollers mounted with freedom of rotation and in spaced relation to the table to accommodate the thickness of the material, the grooves in said rollers being in alignment with the knives and straddling the cuts in the material made by the knives, and means for elevating or lowering the position of the rollers with respect to the table.

10. In a cutting apparatus of the class described, a cutting table upon which the material to be cut is fed, rotary knives mounted in spaced relation for cutting the material into strips as it is fed across the table, means for holding the material upon the table surface during the cutting operation, comprising grooved rollers mounted with freedom of rotation and in spaced relation to the table to accommodate the thickness of the material, the grooves in said rollers being in alignment with the knives and straddling the cuts in the material made by the knives, the spaced relation of the knives with respect to one another being changeable for changing the width of the cuts made thereby, the position of the rollers being adjustable to correspond with the position of the knives, and means for elevating or lowering the rollers with respect to the table.

11. In a cutting apparatus of the class described, a cutting table upon which the material to be cut is fed, rotary knives mounted in adjustably spaced relation for cutting the material into strips as it is fed across the table, means for holding the material upon the table surface during the cutting operation, comprising grooved rollers slidable axially and rotatably mounted, upon a shaft, and means for elevating and lowering the rollers with respect to the table to accommodate the thickness of the material, the grooves in said rollers being in alignment with the knives and straddling the cuts in the material made by the knives.

12. In a cutting apparatus of the class described, a cutting table upon which the material to be cut is fed, rotary knives mounted in adjustably spaced relation for cutting the material into strips as it is fed across the table, means for holding the material upon the table surface during the cutting operation, comprising grooved rollers slidable axially and rotatably mounted upon a shaft, and means for elevating and lowering the rollers with respect to the table to accommodate the thickness of the material, the grooves in said rollers being in alignment with the knives and straddling the cuts in the material made by the knives, and the means for elevating or lowering the rollers comprising an adjustable support for the shaft on which they are mounted.

13. A cutting apparatus as set forth in claim 12, and in which the cutting table is made with a plurality of spaced parallel slots thru which the said knives rotate.

14. In a cutting apparatus of the class described, a plurality of axially adjustable knives arranged in horizontal alignment, a cutting table having spaced slots through which the knives are selectively projected upwardly in cutting position, means for feeding the material to be cut to said cutters comprising a belt upon which the material is supported, and means for urging the material against the belt to prevent slippage in feeding.

15. In a cutting apparatus of the class described, a plurality of axially adjustable knives arranged in horizontal alignment, a cutting table having spaced slots through which the knives are selectively projected upwardly in cutting position, means for feeding the material to be cut to said cutters comprising a belt upon which the material is supported, and means for urging the material against the belt to prevent slippage in feeding comprising a roller and a spring for pressing the roller upon the material.

16. In a cutting apparatus of the class described, a plurality of axially adjustable knives arranged in horizontal alignment, a cutting table having spaced slots through which the knives are selectively projected upwardly in cutting position, means for feeding the material to be cut to said cutters comprising a belt upon which the material is supported, means for urging the material against the belt to prevent slippage in feeding comprising a roller, a spring for pressing the rolls upon the material, and means for regulating the tension of said spring.

Signed at Chicago, Illinois, this 11th day of October 1926.

ALBERT C. FISCHER.
BURNS A. STEWART.
HENRY W. HERBST.